(12) United States Patent
Komura et al.

(10) Patent No.: US 8,462,593 B1
(45) Date of Patent: Jun. 11, 2013

(54) THERMAL-ASSISTED MAGNETIC RECORDING HEAD HAVING DIELECTRIC WAVEGUIDE, METAL WAVEGUIDE AND NEAR-FIELD LIGHT GENERATING ELEMENT

(75) Inventors: Eiji Komura, Tokyo (JP); Koji Shimazawa, Tokyo (JP); Tsutomu Chou, Tokyo (JP); Shinji Hara, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/367,767

(22) Filed: Feb. 7, 2012

(51) Int. Cl.
*G11B 11/00* (2006.01)

(52) U.S. Cl.
USPC .................. 369/13.33; 369/13.13

(58) Field of Classification Search
USPC .......... 369/13.33, 13.13, 13.32, 13.02, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| | | | |
|---|---|---|---|
| 7,042,810 B2 * | 5/2006 | Akiyama et al. | 369/13.33 |
| 7,330,404 B2 | 2/2008 | Peng et al. | |
| 7,440,660 B1 * | 10/2008 | Jin et al. | 385/43 |
| 7,454,095 B2 | 11/2008 | Baehr-Jones et al. | |
| 7,855,937 B2 | 12/2010 | Shimazawa et al. | |
| 8,000,178 B2 | 8/2011 | Shimazawa et al. | |
| 2010/0329085 A1 * | 12/2010 | Kawamori et al. | 369/13.33 |
| 2011/0205860 A1 * | 8/2011 | Chou et al. | 369/13.33 |
| 2011/0216635 A1 * | 9/2011 | Matsumoto | 369/13.33 |

* cited by examiner

*Primary Examiner* — Tan X Dinh
(74) *Attorney, Agent, or Firm* — Posz Law Group, PLC

(57) ABSTRACT

A magnetic head includes a dielectric waveguide to propagate propagation light; a metal waveguide facing the dielectric waveguide, coupling to the propagation light propagating through the dielectric waveguide in a surface plasmon mode, generating first surface plasmon with larger wavenumber than that of the propagation light, and propagating the first surface plasmon; a near-field light generating element facing the metal waveguide and extending to ABS, coupling to the first surface plasmon propagating on the metal waveguide in a surface plasmon mode, generating second surface plasmon with wavenumber larger than that of the first surface plasmon, propagating the second surface plasmon to an end part on the ABS side, and generating near-field light at the end part on the ABS side; and a recording magnetic pole provided in the vicinity of the near-field light generating element and having an end part positioned on the ABS.

17 Claims, 18 Drawing Sheets

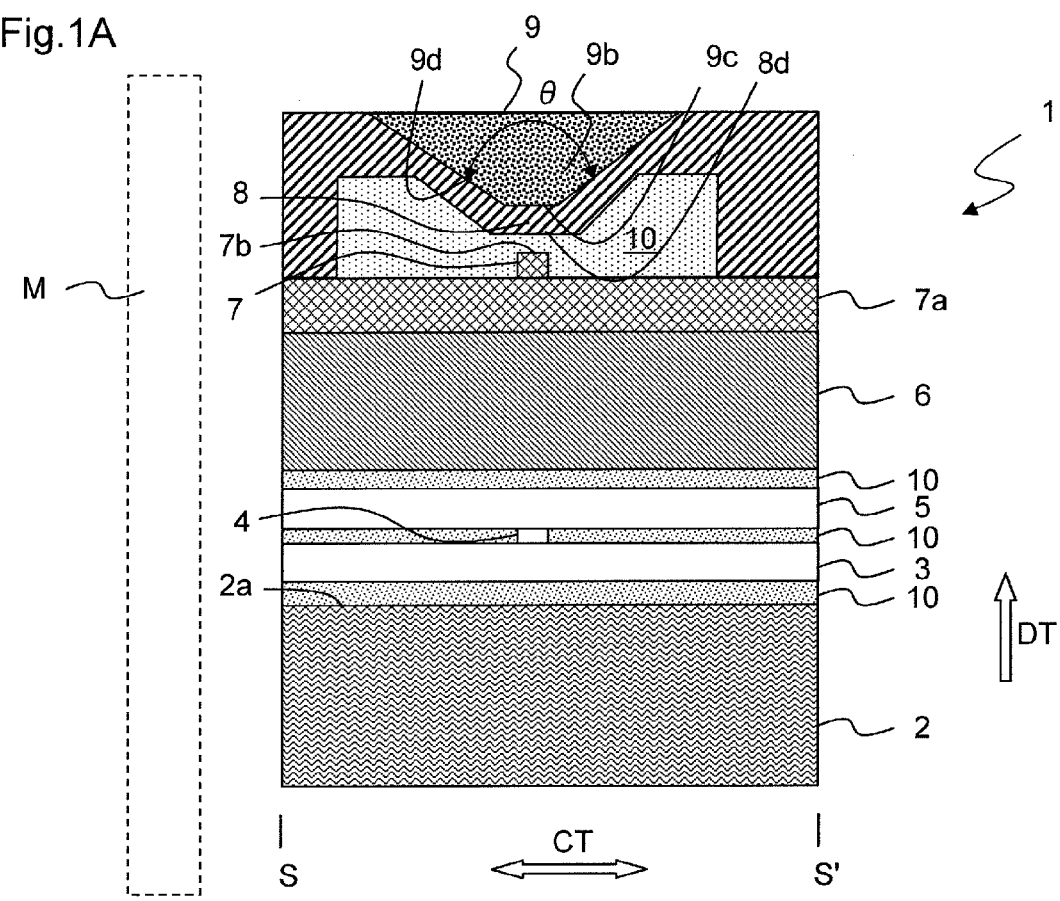

$K_w = 2.046 \times 10^7 [1/m]$

A-A $K_w = 1.468 \times 10^7 [1/m]$

B-B $K_w = 1.441 \times 10^7 [1/m]$

C-C

THERMAL-ASSISTED MAGNETIC RECORDING HEAD HAVING DIELECTRIC WAVEGUIDE, METAL WAVEGUIDE AND NEAR-FIELD LIGHT GENERATING ELEMENT

BACKGROUND OF THE INVENTION

1. Field of the Invention

The present invention relates to a thermal assisted type magnetic head.

2. Description of the Related Art

In order to increase recording density of magnetic recording, a recording method has been known. In the recording method, a magnetic anisotropy constant of a magnetic recording medium is increased to enable stable recording on particles with reduced particle size, and simultaneously coercive force of a magnetic recording medium is reduced by focally heating a region on which recording is performed to make recording easier. A magnetic head using such recording method is called a thermal assisted type magnetic head. A region to be heated on a magnetic recording medium need to be smaller than wavelength of light, near-field light is preferably used as a heating method.

U.S. Pat. No. 7,330,404 discloses a technology of matching oscillation frequency of light and resonant frequency of plasmon generated in a metal by irradiating light to a metal scatterer. However, with this method, the metal scatterer that is a near-field light generating element is deformed by excessive heating, so practical use of this method is difficult. As a technology with which such excessive heating can be prevented, in U.S. Pat. No. 7,855,937 and U.S. Pat. No. 8,000,178, a thermal assisted head using surface plasmon polariton coupling has been proposed. The technology described in these specifications uses surface plasmon polariton that is generated on a surface of the near-field light generating element by evanescently coupling light propagating through a waveguide to the near-field light generating element instead of directly irradiating the light to a plasmon antenna. Using surface plasmon enables to suppress that the entire near-field light generating element is heated.

On the other hand, in order to obtain a small magnetization reversal pattern with a high signal-to-noise ratio (S/N ratio), a light spot with high energy and a sufficiently narrowed spot size needs to be formed on a magnetic recording medium. In order to form a light spot with high energy using a structure that light propagating through a waveguide and a near-field light generating element are evanescently coupled, it is needed to generate intense near-field light, and in order to achieve that, it is preferred to enhance coupling efficiency of evanescent coupling of the near-field light generating element and the propagation light. In order to enhance the coupling efficiency, it is preferred that difference between wavenumber of the light propagating through the waveguide and wavenumber of surface plasmon polariton generated in the near-field light generating element becomes not significantly large. However, because spot size of near-field light and the wavenumber are in a negative correlation, the spot size cannot be sufficiently narrowed when mismatch of the wavenumbers is small. When the wavenumber of surface plasmon polariton is increased to narrow the spot size, the coupling efficiency of evanescent coupling is degraded.

The objective of the present invention is to provide a thermal assisted type magnetic head that can generate near-field light with high energy density and a small spot size and that easily suppresses performance degradation due to excessive heating.

SUMMARY OF THE INVENTION

A magnetic head of the present invention includes a dielectric waveguide that is configured to propagate laser light as propagation light, a metal waveguide facing the dielectric waveguide, wherein the metal waveguide is configured to couple to the propagation light propagating through the dielectric waveguide in a surface plasmon mode, to generate first surface plasmon with larger wavenumber than that of the propagation light, and to propagate the first surface plasmon, a near-field light generating element facing the metal waveguide and extending to an air bearing surface, wherein the near-field light generating element couples to the first surface plasmon propagating on the metal waveguide in a surface plasmon mode, generates second surface plasmon with wavenumber larger than that of the first surface plasmon, propagates the second surface plasmon to an end part on the air bearing surface side, and generates near-field light at the end part on the air bearing surface side, and a recording magnetic pole that is provided in the vicinity of the near-field light generating element and that has an end part positioned on the air bearing surface.

With such configuration, because light energy is transmitted using surface plasmon with large spot size and small loss, heating of the entirety of the near-field light generating element is suppressed, and thereby it becomes easy to suppress the performance degradation due to excessive heating. Light energy is transmitted at the two stages between the dielectric waveguide and the metal waveguide and between the metal waveguide and the near-field light generating element. The wavenumber is increased at each of the stages, so that a significant mismatch of the wavenumbers is prevented and also it becomes possible to enhance transmission efficiency of light energy that is in other words coupling efficiency at each of the stages. Therefore, compared to only-one-time energy transmission between the dielectric waveguide and the near-field light generating element, the transmission efficiency of light energy is enhanced and further intense near-field light can be generated. Similarly, because the wavenumber is increased at the two stages, it is also easy to narrow the spot size of near-field light.

The above description, as well as other objects, features, and advantages of the present invention will be evident by the description that follows below with reference to attached drawings exemplifying the present invention.

BRIEF DESCRIPTION OF THE DRAWINGS

FIG. 1A is a main body schematic view illustrating an air bearing surface of a magnetic head.

DETAILED DESCRIPTION OF THE INVENTION

Descriptions will be given of magnetic heads according to several embodiments of the present invention with reference to the drawings.

Figure 1B:
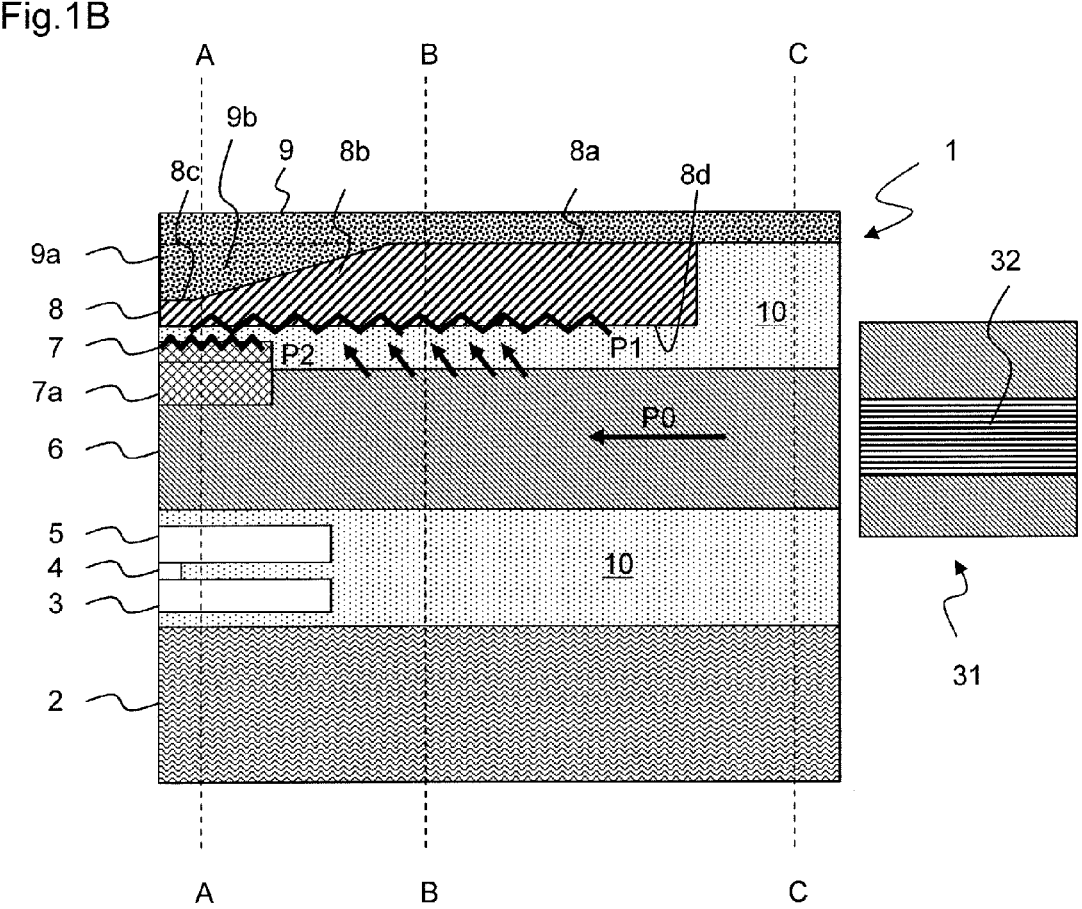
FIG. 1B is a main body schematic view of the magnetic head from the perspective of a cross section orthogonal to the air bearing surface and a principle plane of a substrate.

FIG. 1A is a main body schematic view illustrating an air bearing surface of a magnetic head according to one embodiment of the present invention. FIG. 1B is a main body schematic view of the magnetic head from the perspective of a cross section orthogonal to the air bearing surface and a principle plane of a substrate. The air bearing surface is a surface of the magnetic head that faces a magnetic recording medium, and the principle plane of the substrate is a plane of the substrate on which the magnetic head is formed.

A magnetic head 1 has a magneto resistance (MR) element 4 that is provided above a substrate 2 made of ALTIC ($Al_2O_3$—TiC). The MR element 4 has a tip end part exposed on an air bearing surface S and is positioned between an upper shield layer 5 and a lower shield layer 3. To the MR element 4, any arbitrary configuration using magnetoresistive effect can be applied such as a current in plane(CIP)-gigantic magneto resistive(GMR) element in which a sense current flows in a direction parallel to the principle plane of the substrate, a current perpendicular to plane(CPP)-GMR element in which a sense current flows in a direction (lamination direction or recording medium traveling direction DT) perpendicular to a principle plane 2a of the substrate 2, and a tunneling magneto resistive(TMR) element using a tunnel effect. When the CPP-GMR element or the TMR element is applied, the upper shield layer 5 and the lower shield layer 3 are also used as electrodes for supplying a sense current.

The magnetic head 1 has a recording pole 9 (or recording magnetic pole) for perpendicular magnetic recording. The recording pole 9 is provided in the vicinity of a near-field light generating element 7, which will be described later, and a pole tip end part 9a (or tip end part of the recording magnetic pole) is positioned on the air bearing surface S. The recording pole 9 is formed of an alloy made of any two or three of Ni, Fe, and Co, or the like. A magnetic flux generated inside the recording pole 9 by a not-illustrated coil is discharged from the pole tip end part 9a toward a magnetic recording medium M, and then magnetic recording on the magnetic recording medium M is performed. The recording pole 9 has a projection part 9b projected toward the near-field light generating element 7 in the position facing the near-field light generating element 7. The projection part 9b also forms a portion of the recording pole 9 and discharges a magnetic flux. Therefore, a magnetic flux is discharged from the vicinity of the near-field light generating element 7 and more efficient thermal assisted magnetic recording becomes possible.

A laser diode 31 is provided adjacent to the magnetic head 1. The laser diode 31 is an edge emitting type, and a laser diode normally used for communication, optical system disk storages, or material analysis such as InP-system, GaAs-system, GaN-system or the like is usable. The wavelength of laser light to be radiated is not limited in particular; however, the wavelength in the range of 375 nm-1.7 μm can be used, and the wavelength of approximately 800 nm is preferably used in particular. An active layer 32 in which laser light continuously oscillates of the laser diode 31 emits laser light toward a dielectric waveguide 6 of the magnetic head 1, the dielectric waveguide 6 being positioned facing the active layer 32.

Figure 2:
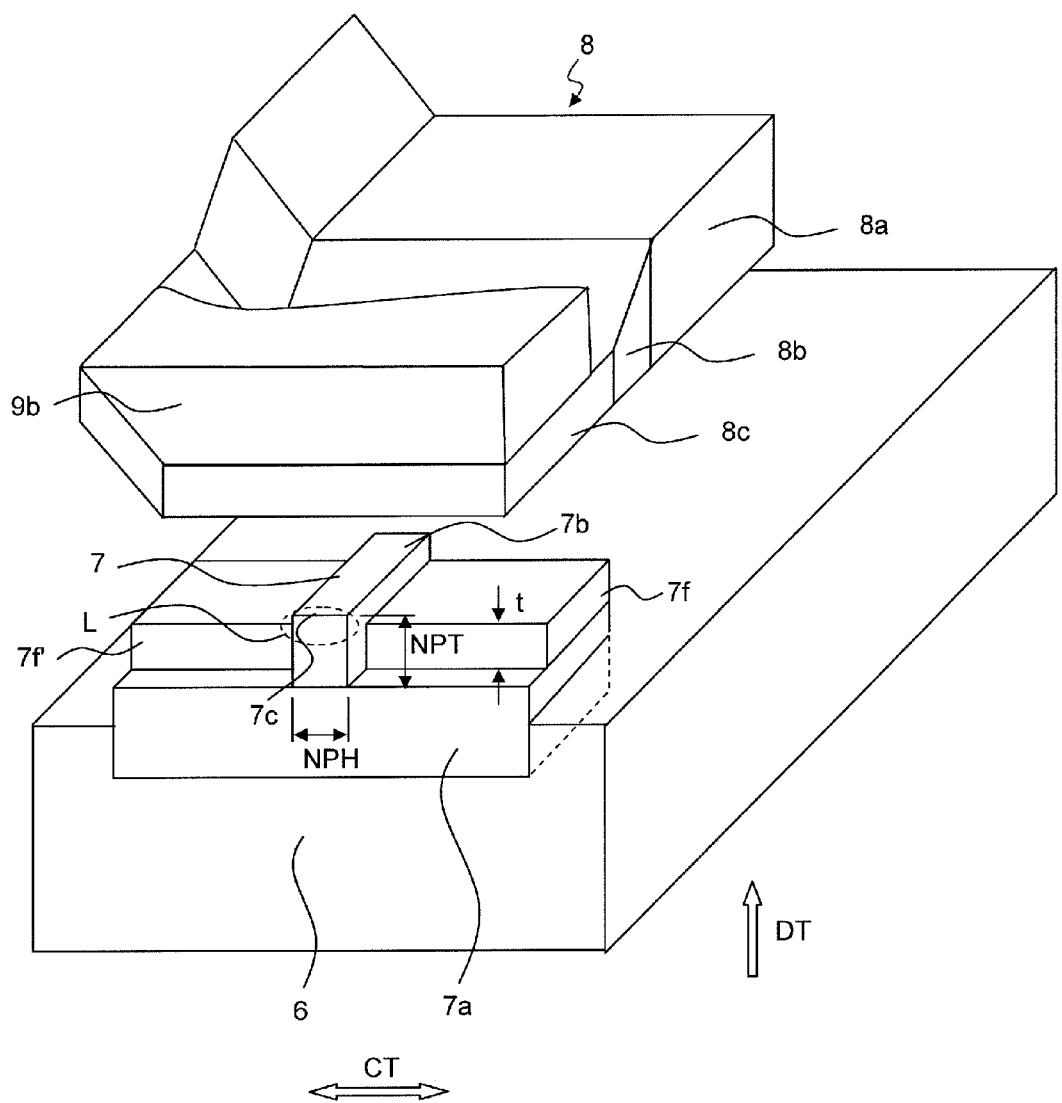
FIG. 2 is a perspective view illustrating optical elements (a dielectric waveguide, a near-field light generating element, and a metal waveguide) in the vicinity of the air bearing surface.

The magnetic head 1 is provided with the dielectric waveguide 6 that can propagate laser light as propagation light P0, a metal waveguide 8 that couples to the propagation light P0 propagating through the dielectric waveguide 6 in a surface plasmon mode and that generates and propagates first surface plasmon P1, and a near-field light generating element 7 that couples to the first surface plasmon P1 propagating on the metal waveguide 8 in a surface plasmon mode, that generates and propagates second surface plasmon P2, and that generates near-field light. FIG. 2 is a perspective view illustrating the dielectric waveguide 6, the near-field light generating element 7, and the metal waveguide 8 in the vicinity of the air bearing surface. Hereinafter, a detail description is given of these optical elements with reference to FIGS. 1A, 1B and 2. In FIGS. 1A and 1B, the dielectric waveguide 6, the near-field light generating element 7, the metal waveguide 8, and the recording pole 9 are laminated in the recording medium traveling direction DT in this order; however, these may also be laminated in the reversed order.

<Dielectric Waveguide 6>

The dielectric waveguide 6 is an optical member that linearly extends inside the magnetic head 1 and has a nearly rectangular cross section. In the present embodiment, the dielectric waveguide 6 extends from the air bearing surface S to an opposite surface S' facing the laser diode 31; however, may end at a position slightly recessed from the air bearing surface S. The dielectric waveguide 6 has a higher refractive index than that of an insulating layer 10 positioned therearound. When light totally reflects off an interface between the dielectric waveguide 6 and the insulating layer 10, laser light entered from the laser diode 31 propagates through the dielectric waveguide 6 as the propagation light P0. The dielectric waveguide 6 forms a core of the waveguide system, and the insulating layer 10 forms a cladding of the waveguide system. When the wavelength of laser light is 600 nm, the cladding (insulating layer 10) may be formed of, for example, $SiO_2$, and the core (dielectric waveguide 6) may be formed of, for example, $Al_2O_3$. When the cladding is formed of $Al_2O_3$, the core may be formed of, for example, tantalum oxide (TaOx). When the wavelength of laser light is 800 nm, the cladding may be formed of, for example, $Al_2O_3$, and the core may be formed of, for example, TaOx. Herein, TaOx means tantalum oxide with arbitrary composition, which is typically $Ta_2O_5$, TaO, $TaO_2$, and the like; however, is not limited to these.

<Metal Waveguide 8>

The metal waveguide 8 is a metal plate of noble metal that is positioned facing the dielectric waveguide 6 with the insulating layer 10 therebetween. The metal waveguide 8 is formed of a metal mainly composed of gold, silver, copper, aluminum, or platinum, or an alloy composed of these. The metal waveguide 8 can evanescently couple to the propagation light P0 propagating through the dielectric waveguide 6, generate the first surface plasmon P1 with larger wavenumber than that of the propagation light P0, and propagate the first surface plasmon P1. The first surface plasmon P1 propagating on the metal waveguide 8 evanescently couples to the near-field light generating element 7, thereby generating the second surface plasmon P2 on the near-field light generating element 7. The metal waveguide 8 is provided on at least a tip end surface 9c of the projection part 9b of the recording pole 9, the tip end surface 9c facing the near-field light generating element 7.

The metal waveguide 8 is configured with a portion 8a with a constant thickness positioned on the opposite surface S' side of the air bearing surface S, a portion 8b with a thickness continuously reducing as getting close to the air bearing surface S, and a portion 8c with a constant thickness positioned on the air bearing surface side, the thickness being smaller than that of the portion 8a. By thinning the metal waveguide 8 as described above as the metal waveguide 8 gets close to the air bearing surface S, the projection part 9b can be formed. Evanescent coupling of the dielectric waveguide 6 and the metal waveguide 8 occurs mainly in the portions 8a and 8b. Evanescent coupling of the near-field light generating element 7 and the metal waveguide 8 preferably occurs mainly in the portion 8b such that the first surface plasmon P1 generated in the metal waveguide 8 does not heat the pole tip end part.

The metal waveguide 8 has a facing surface 8d that faces the dielectric waveguide 6 and the near-field light generating element 7. Evanescent coupling of the dielectric waveguide 6 and the near-field light generating element 7 occurs in the facing surface 8d. The facing surface 8d extends from the air bearing surface S toward the opposite surface S'. The facing surface 8d has an almost flattened shape as illustrated in FIG. 1A, so the first surface plasmon P1 is generated in a relatively large area from the perspective of the cross section perpendicular to the propagation direction of the propagation light P0. The wavenumber of the first surface plasmon P1 is not significantly different from the wavenumber of the propagation light P0 propagating through the dielectric waveguide 6. Therefore, the coupling efficiency of evanescent coupling is high and light energy can be efficiently transmitted to the metal waveguide 8. On the other hand, because the wavenumber of the first surface plasmon P1 is larger than that of the propagation light P0 and the light spot size is narrowed, evanescent coupling with the near-field light generating element 7 is performed with high efficiency.

The metal waveguide 8 is formed on a side surface 9d of the projection part 9b of the recording pole 9 to enhance heat dissipation. Light penetrates into the metal waveguide 8 when the metal waveguide 8 evanescently couples to the propagation light P0 propagating through the dielectric waveguide 6, and thereby the metal waveguide 8 is heated. By covering almost entire surfaces of the projection part 9b of the recording pole 9 with the metal waveguide 8, heat generated in the metal waveguide 8 can efficiently be released to the recording pole 9.

<Near-Field Light Generating Element 7>

The near-field light generating element 7 is a pole-shaped member of noble metal positioned facing the metal waveguide 8. The near-field light generating element 7 extends in the insulating layer 10 to the air bearing surface S. The near-field light generating element 7 is formed of a metal mainly composed of gold, silver, copper, aluminum, or platinum, or an alloy of these. The near-field light generating element 7 evanescently couples to the first surface plasmon P1 propagating on the metal waveguide 8 and generates the second surface plasmon P2 with larger wavenumber than that of the first surface plasmon P1 propagating on the metal waveguide 8. The second surface plasmon P2 is generated at an edge part 7b facing the metal waveguide 8 of the near-field light generating element 7 and propagates to an edge part 7c on the air bearing surface S side along the edge part 7b, thereby generating near-field light L at the edge part 7c on the air bearing surface S side. A width NPH of the near-field light generating element 7 in the track width direction CT on the air bearing surface S defines the width of light spot of near-field light, and thereby it is preferred to make the thickness NPH sufficiently small and is preferred to set at, for example, 45 nm or less. On the other hand, a width NPT in the recording medium traveling direction DT of the near-field light generating element 7 on the air bearing surface S is preferably set at, for example, 10 nm or more and 60 nm or less because the edge part 7c of the near-field light generating element 7 is preferred to be distanced at a certain distance from a noble metal layer near the edge part 7c, which is specifically a first heat dissipation layer 7a, which will be described later.

Figure 3:
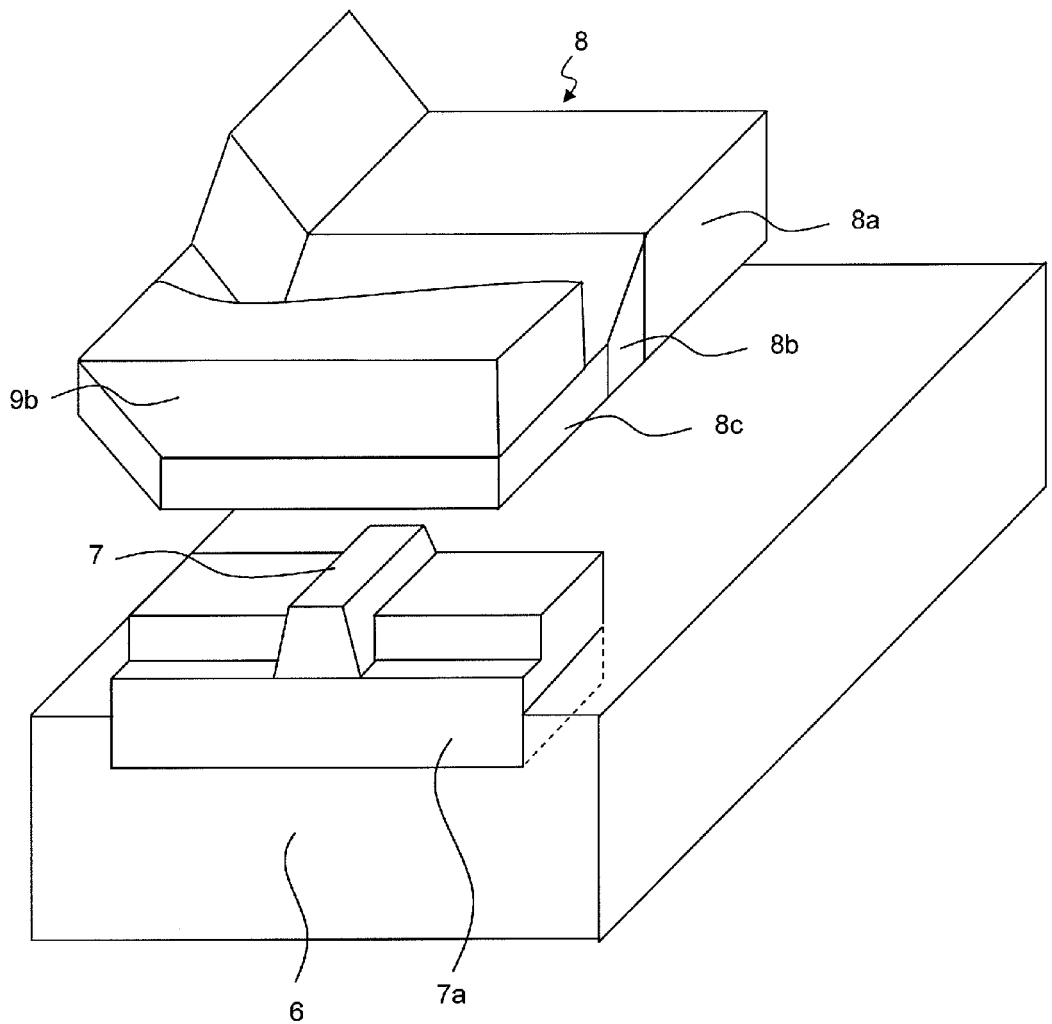
FIGS. 3-5 are views that illustrate other embodiments of the near-field light generating element and that are similar to FIG. 2.
Figure 4:
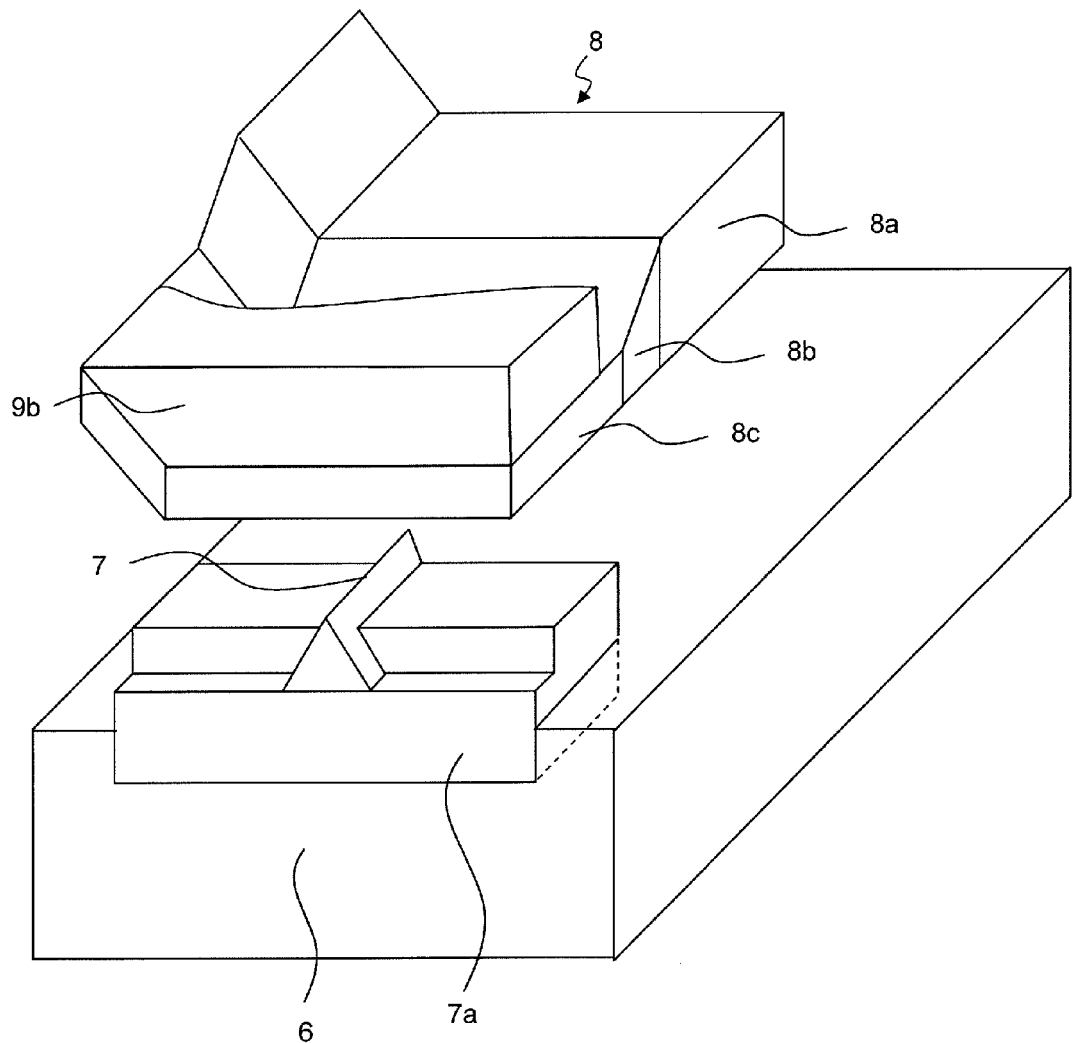

The cross-sectional shape of a cross section parallel to the air bearing surface S of the near-field light generating element 7 is, as illustrated in FIGS. 1A and 2, a rectangle with one side facing the recording pole 9; however, the cross-sectional shape may also be, as illustrated in FIG. 3, a trapezoid with a short side, which is the one out of parallel two sides, facing the recording pole 9, or may also be, as illustrated in FIG. 4, a triangle with one apex facing the recording pole 9.

Figure 5:
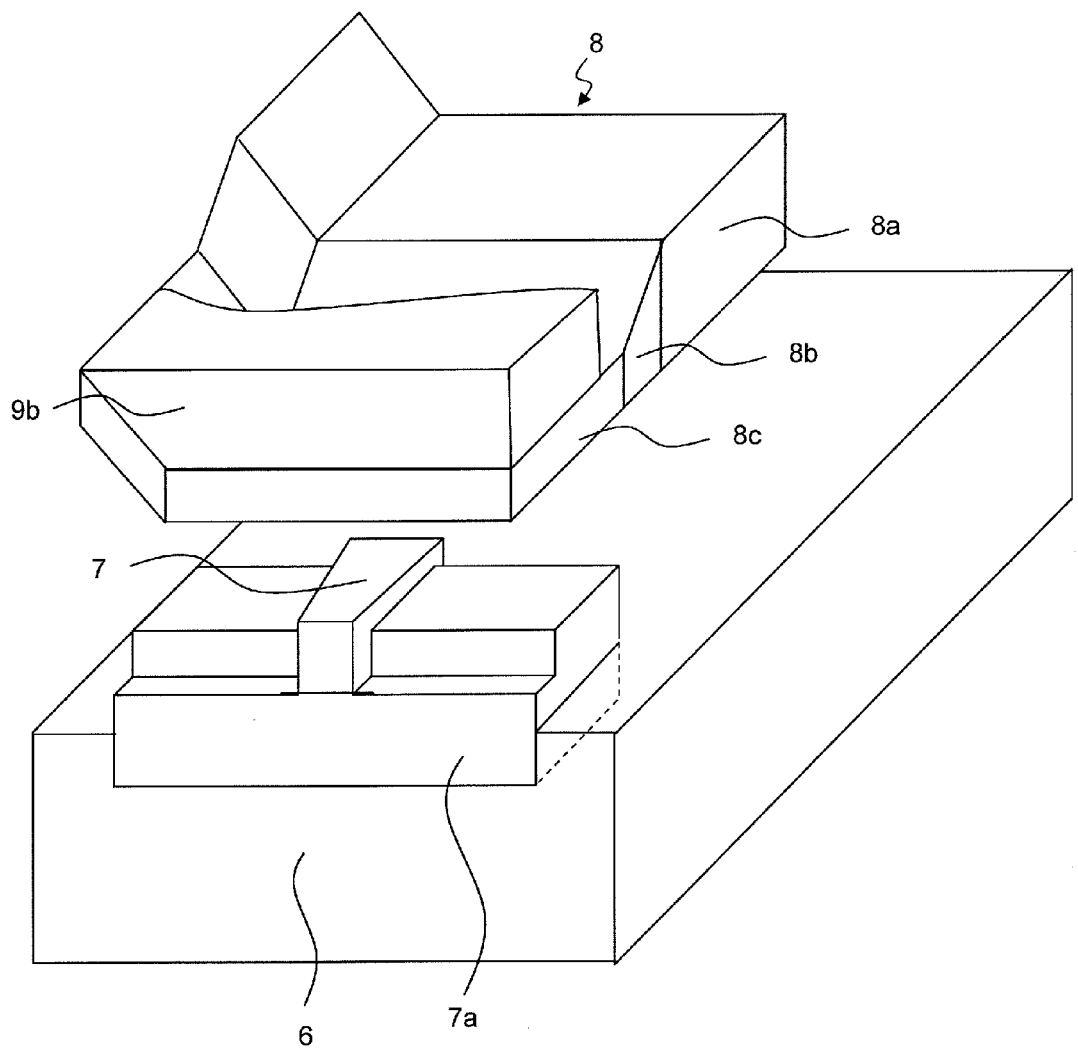

As illustrated in FIG. 5, the near-field light generating element 7 may also have a shape whose cross section is narrowed toward the air bearing surface S. By having such shape, light energy is intensified at the tip end part of the near-field light generating element 7 and thereby light intensity can be intensified. Also, heat dissipation is improved, so that M/H ratio, which will be described later, raises and the reliability of the magnetic head can be increased.

<First and Second Heat Dissipation Layer>

In order to enhance the heat dissipation of the near-field light generating element 7, a first heat dissipation layer 7a is provided on the back side of the near-field light generating element 7 from the perspective of the recording pole 9 in the manner of contacting the near-field light generating element 7. The first heat dissipation layer 7a has a larger size in the track width direction CT than that of the near-field light generating element 7, and is partially embedded in the dielectric waveguide 6. The first heat dissipation layer 7a is formed of a metal mainly composed of gold, silver, copper, aluminum, or platinum, or an alloy composed of these. Upon manufacturing process, the first heat dissipation layer 7a is preferably made of the material the same as that of the near-field light generating element 7 and formed in an integrated manner to the near-field light generating element 7.

Figure 6:
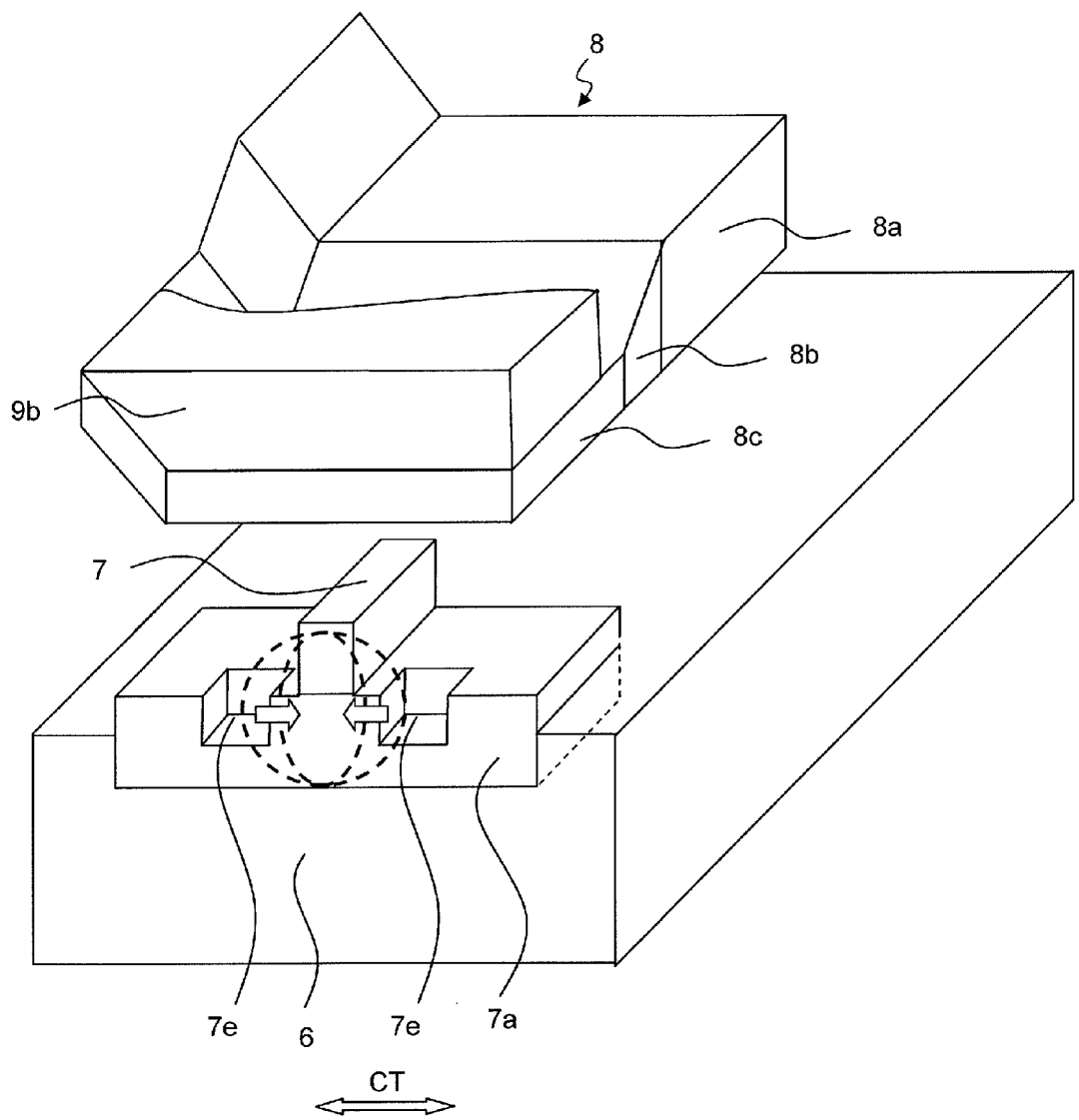
FIGS. 6-7 are views that illustrate another embodiment of a first heat dissipation layer and that are similar to FIG. 2.

As illustrated in FIG. 6, the first heat dissipation layer 7a may have cavity parts 7e that open toward the air bearing surface S on both sides of the near-field light generating element 7 in the track width direction CT. By providing these cavity parts 7e, as illustrated by broken lines in the figure, a thermal spot on the magnetic recording medium can be narrowed in the track width direction CT. The cavity parts 7e may be formed only on one side.

Figure 7:
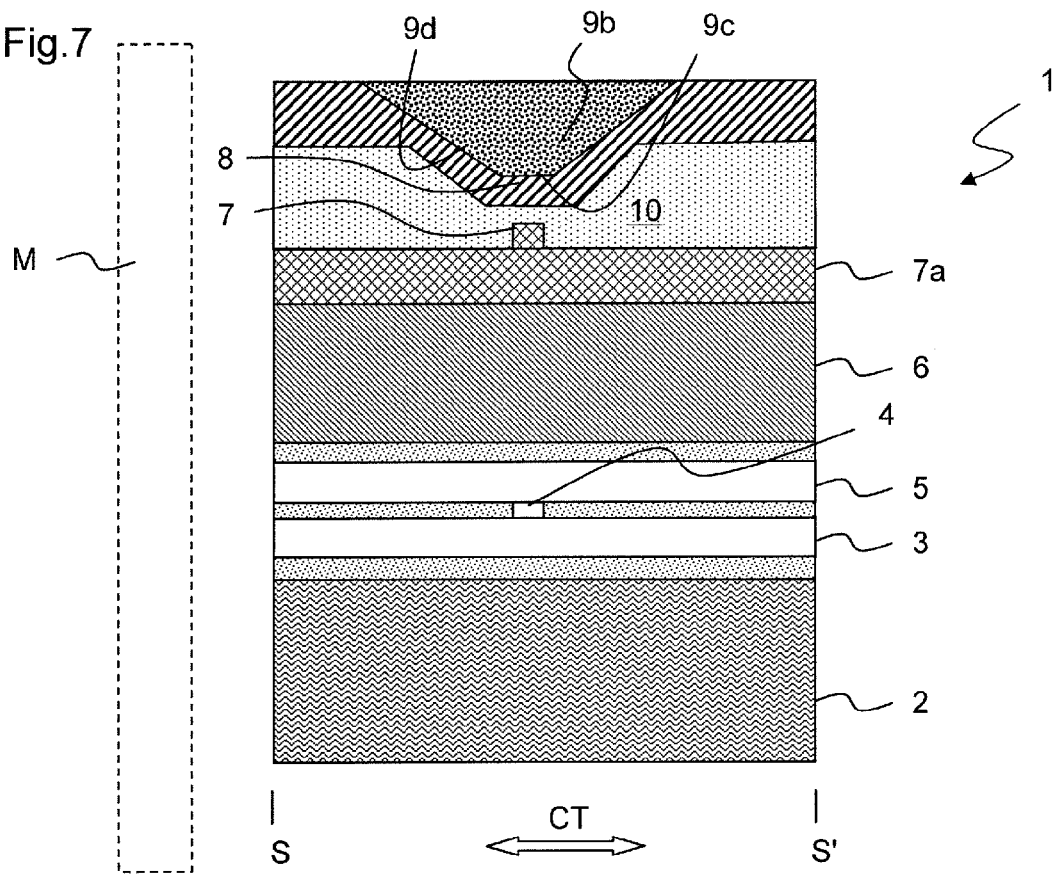

In order to enhance the heat dissipation, the first heat dissipation layer 7a may be linked to the metal waveguide 8 as illustrated in FIG. 1A; however, as illustrated in FIG. 7, the first heat dissipation layer 7a may also be separated from the metal waveguide 8 on the air bearing surface S. Specifically, the portions of the metal waveguide 8 positioned on the lateral sides of the near-field light generating element 7 are replaced with the insulating layer 10. The first heat dissipation layer 7a need only be separated from the metal waveguide 8 on at least the air bearing surface S. With such separation structure as illustrated in FIG. 7, no metal element exists on the lateral sides of the near-field light generating element 7, and thereby surface plasmon is effectively trapped in the near-field light generating element 7 and a thermal spot on the magnetic recording medium can be narrowed in the track width direction CT.

In order to further enhance the heat dissipation, on both lateral sides of the near-field light generating element 7 in the track width direction CT, second heat dissipation layers 7f and 7f' are provided in the manner of contacting the first heat dissipation layer 7a and the near-field light generating element 7. The second heat dissipation layers 7f and 7f' are made of a metal mainly composed of gold, silver, copper, aluminum, or platinum, or an alloy of these; upon manufacturing process, the second heat dissipation layers 7f and 7f' are preferably made of the material the same as that of the first heat dissipation layer 7a and the near-field light generating element 7 and formed in an integrated manner to the first dissipation layer 7a and the near-field light generating element 7. It is also possible to provide one of the second heat dissipation layers 7f and 7f' only on one side of the lateral sides of the near-field light generating element 7 in the track width direction CT.

The second heat dissipation layers 7f and 7f' are formed in the position distanced from the air bearing surface S, in other words, in the position recessed from the air bearing surface S in the direction orthogonal to the air bearing surface S. Thereby, the tip end part 7c of the near-field light generating element 7 is prevented from contacting the second heat dissipation layers 7f and 7f' on the air bearing surface S, and near-field light L is certainly formed at the tip end part 7c of the near-field light generating element 7.

Figure 8:
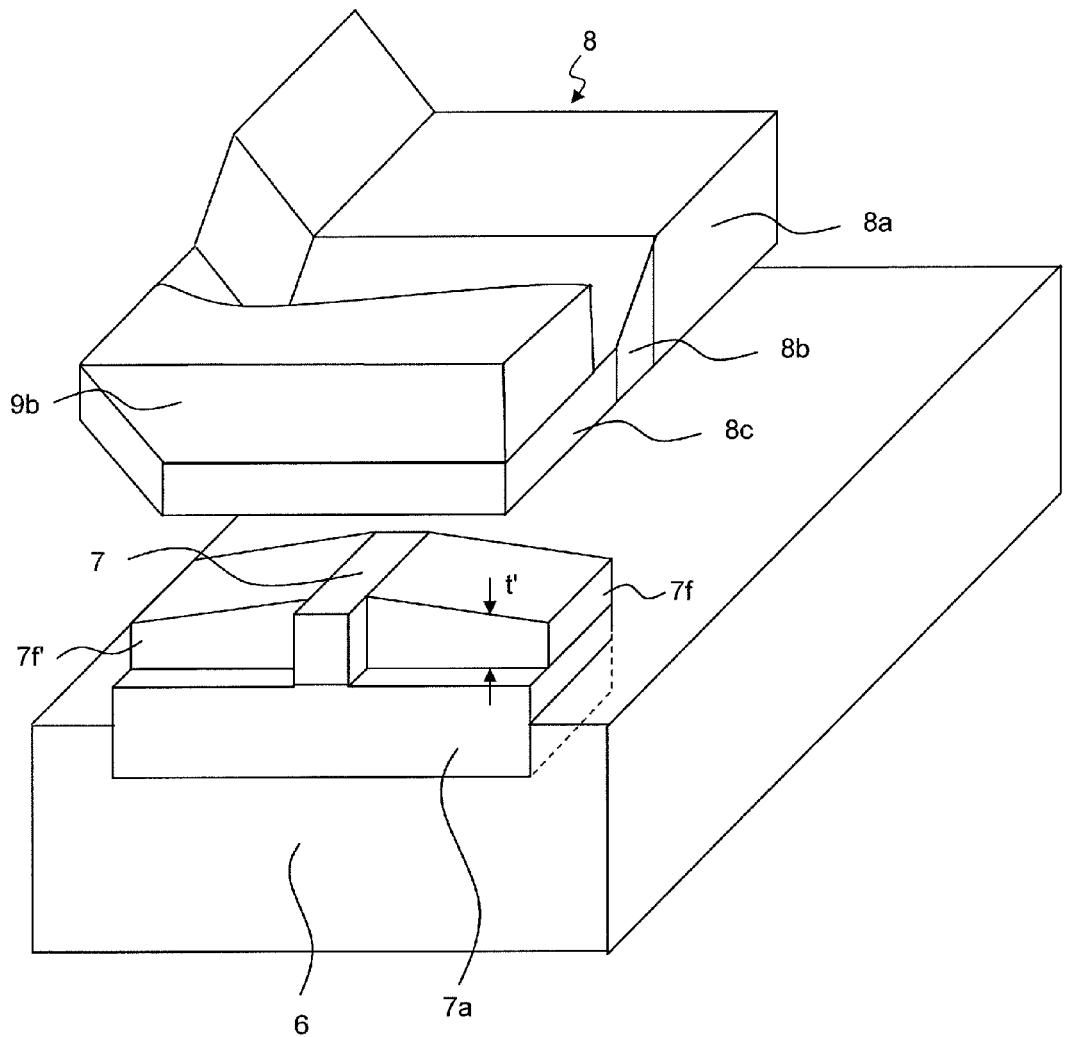
FIG. 8 is a view that illustrate another embodiment of second heat dissipation layers and that is similar to FIG. 2.

The second heat dissipation layers 7f and 7f' may have a constant film thickness t smaller than the thickness of the near-field light generating element 7 as illustrated in FIG. 2; however, as illustrated in FIG. 8, the second heat dissipation layers 7f and 7f' may also have a film thickness t' that increases as getting close to the near-field light generating element 7. This increases an area where the second heat dissipation layers 7f and 7f' and the near-field light generating element 7 contact each other, and thereby the heat dissipation can be enhanced. In FIG. 8, at the position where the second heat dissipation layers 7f and 7f' contact the near-field light generating element 7, the upper surface of the near-field light generating element 7 and the upper surfaces of the second heat dissipation layers 7f and 7f' match; however, the upper surface of the near-field light generating element 7 may be positioned on the downstream side of the medium traveling direction DT compared to the upper surfaces of the second heat dissipation layers 7f and 7f'.

As described above, in the present embodiment, light energy of laser light entered from the laser diode 31 into the dielectric waveguide 6 is transmitted to the metal waveguide 8 when the dielectric waveguide 6 and the metal waveguide 8 couple to each other in surface plasmon mode; further, the light energy is transmitted to the near-field light generating element 7 when the metal waveguide 8 and the near-field light generating element 7 couple to each other in surface plasmon mode. When light energy is transmitted at such two stages as described above, the wavenumber of propagation light increases after each transmission. Thereby, it becomes possible to narrow light spot as increasing the wavenumber at each stage by each energy transmission, and as a result, a significant mismatch of the wavenumbers is prevented and the transmission efficiency of light energy is increased.

In the present embodiment, there is also an advantage that the angle θ of the projection part 9b of the recording pole 9 can be set large. In other words, in order to narrow light spot, it is effective to set the angle θ of the projection part 9b smaller (see also FIG. 10B) so that the angle of the tip end part of the metal waveguide 8 is made smaller; however, in such instance, it becomes difficult to increase the cross sectional area of the projection part 9b so that sufficient magnetic field intensity cannot be secured. On the other hand, because in the present embodiment light spot is narrowed at the two stages, the necessity of making the angle θ of the tip end part of the metal waveguide 8 smaller is small. Therefore, it is easy to increase the cross sectional area of the projection part 9b and to secure the magnetic field intensity.

Also, excessive energy is not input to the near-field light generating element 7 because light energy is sequentially transmitted by two-time evanescent coupling, and the first and second heat dissipation layers 7f and 7f' are provided; thereby, appropriate heat dissipation of the near-field light generating element 7 can be secured. Also regarding the metal waveguide 8, the projection part 9b of the recording pole 9 functions as a heat dissipation layer, and thereby the heat dissipation can be secured.

Next, referring to FIGS. 9A-9N, description of manufacturing process of the magnetic head described above will be given focusing especially on the dielectric waveguide 6, the near-field light generating element 7, the first and second heat dissipation layers 7a, 7f and 7f', the metal waveguide 8, and the recording pole 9.

Figure 9A:
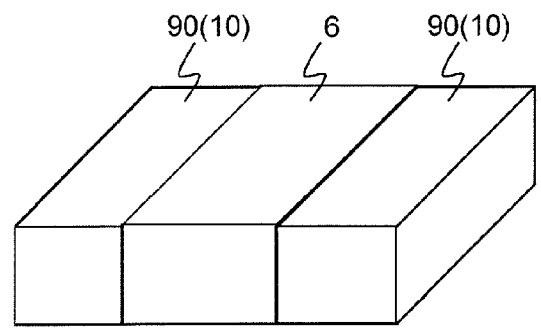
FIGS. 9A-9N are step drawings illustrating manufacturing processes of the magnetic head.

At first, as illustrated in FIG. 9A, a TaOx layer is formed by sputtering, a resist is coated on a portion that eventually becomes the dielectric waveguide 6, the TaOx layer is milled to have a long and narrow shape, and the dielectric waveguide 6 made of TaOx is formed. Then, on both lateral sides of the dielectric waveguide 6, $SiO_2$ layers 90 that eventually become the cladding (insulating layer 10) of the dielectric waveguide 6 are formed, and upper surfaces of the TaOx layer 6 and the $SiO_2$ layers 90 are planarized by chemical mechanical polishing (CMP).

Figure 9B:
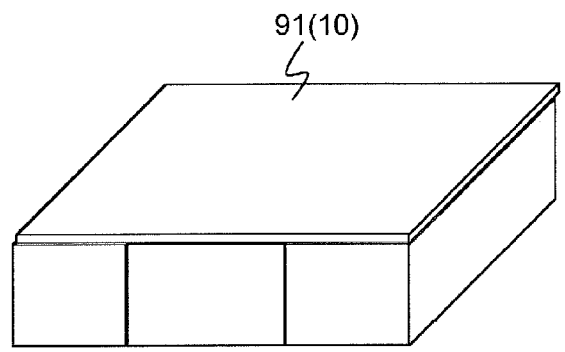
Figure 9C:
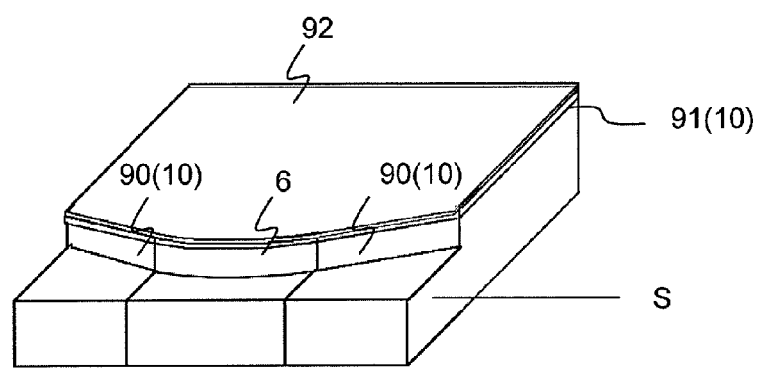
Figure 9D:
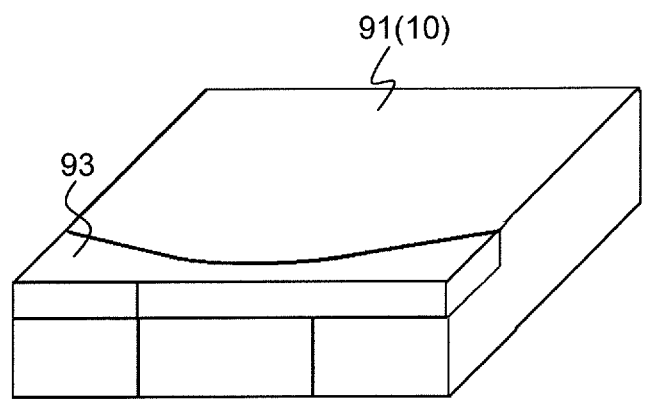

Next, as illustrated in FIG. 9B, a $SiO_2$ layer 91 that eventually becomes the cladding (insulating layer 10) is formed on the upper surfaces of the TaOx layer 6 and the $SiO_2$ layers 90, the $SiO_2$ layer 91 separating a region of the dielectric waveguide 6 and the near-field light generating element 7 and a region of the metal waveguide 8. Next, as illustrated in FIG. 9C, a metal resist 92 is formed, and a certain region of the $SiO_2$ layer 91, the TaOx layer 6, and the $SiO_2$ layer 90 was removed by milling, the TaOx layer 6 and the $SiO_2$ layer 90 being provided underneath the TaOx layer 6, the certain region being along the orthogonal direction from the air bearing surface S, Next, as illustrated in FIG. 9D, a noble-metal layer 93 that eventually becomes the near-field light generating element 7 and the first and second heat dissipation layers 7a, 7f, and 7f' is formed in the removed region by plating, the metal resist 92 is removed by CMP, and the noble-metal layer 93 and the $SiO_2$ layer 91 are planarized.

Figure 9E:
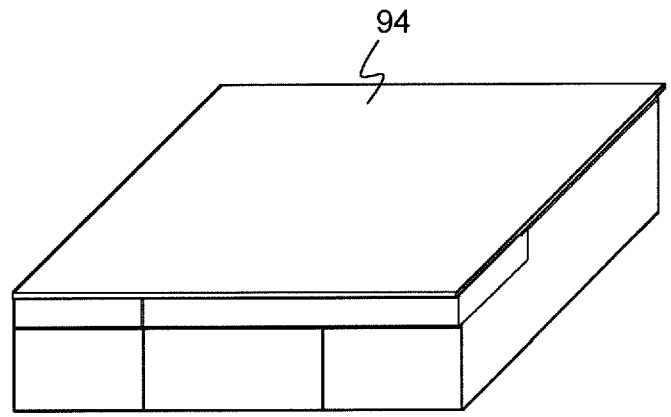
Figure 9F:
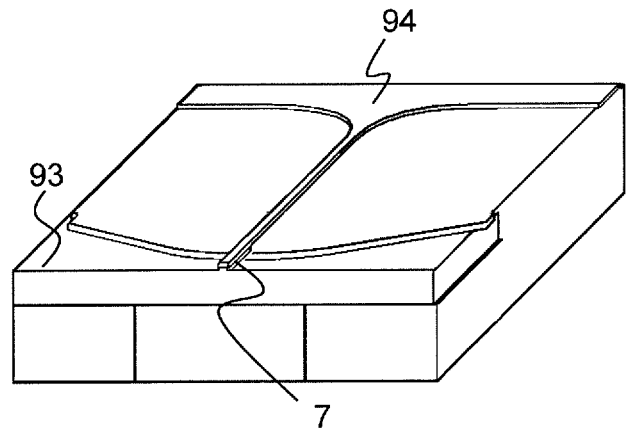
Figure 9G:
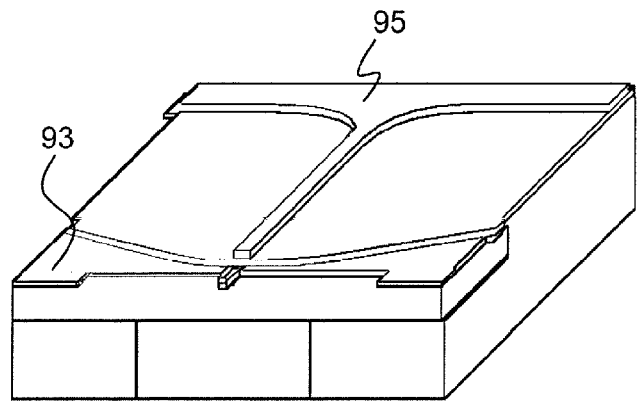
Figure 9H:
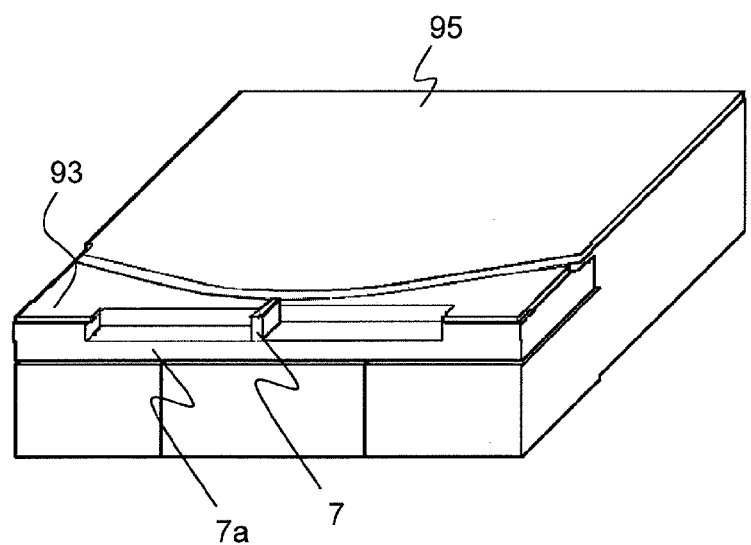
Figure 9I:
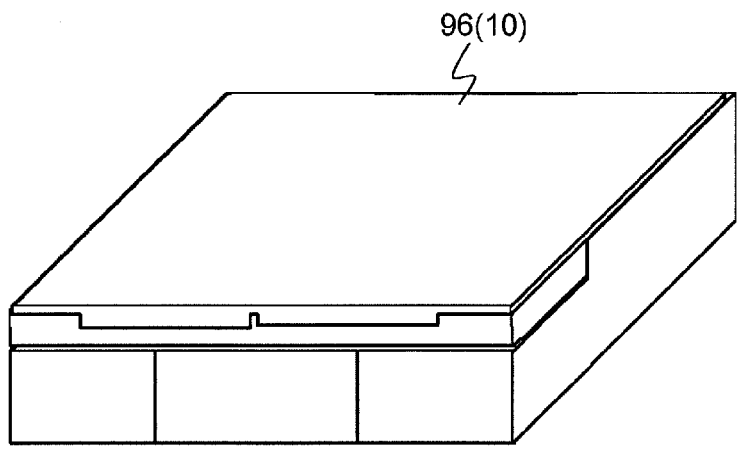

Next, as illustrated in FIG. 9E, a metal resist 94 is formed. Next, as illustrated in FIG. 9F, the surface of the noble-metal layer 93 is removed. At this time, by patterning the metal resist 94 beforehand so as not to remove the noble-metal layer 93 in the position of the near-field light generating element 7, the near-field light generating element 7 is formed. Next, as illustrated in FIG. 9G, a metal resist 95 is formed again and is patterned. Next, as illustrated in FIG. 9H, a portion of the noble-metal layer 93 is removed along the air bearing surface S by reactive ion etching (RIE), and the first heat dissipation layer 7a of the near-field light generating element 7 is formed. At this timing, it is also possible to form simultaneously the second heat dissipation layers 7f and 7f' (not illustrated). Next, as illustrated in FIG. 9I, the metal resist 95 is dissolved and removed by lift off, and a SiO$_2$ layer 96 that eventually becomes a portion of the insulating layer 10 is formed by sputtering.

Figure 9J:
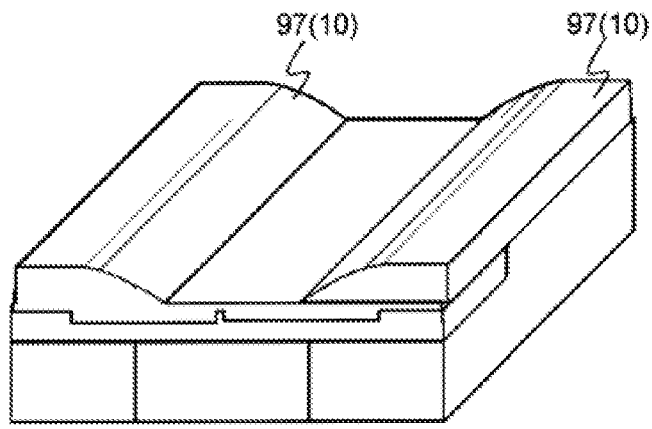
Figure 9K:
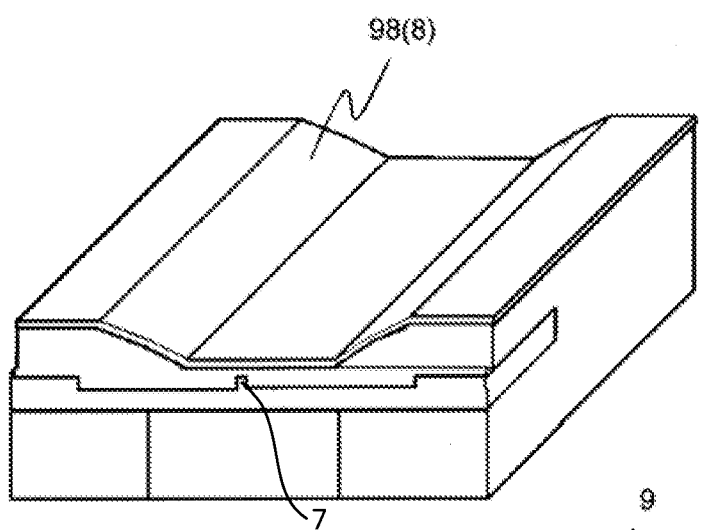
Figure 9L:
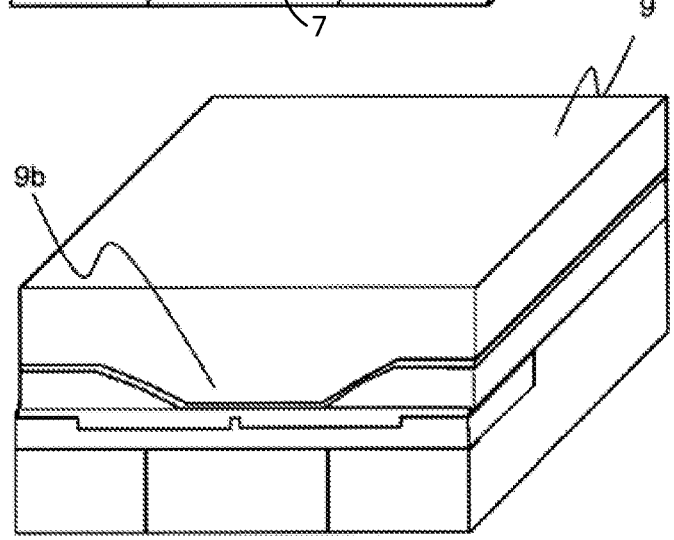
Figure 9M:
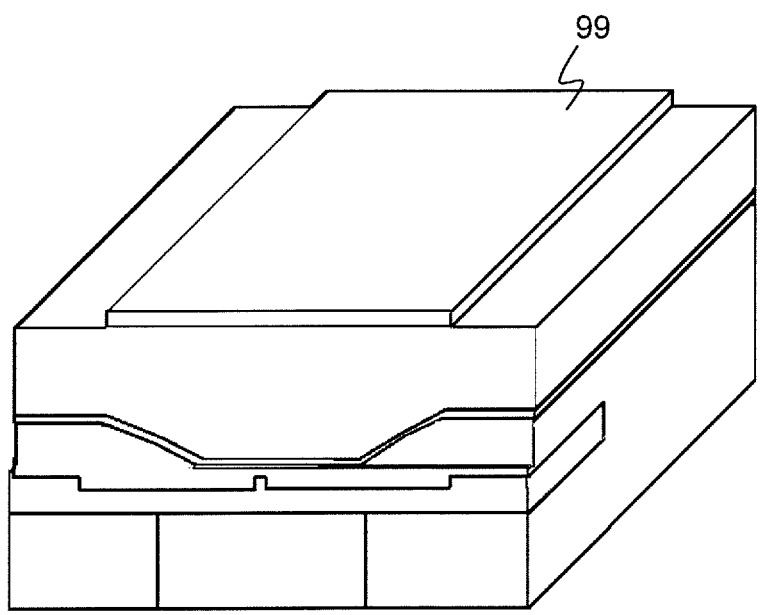
Figure 9N:
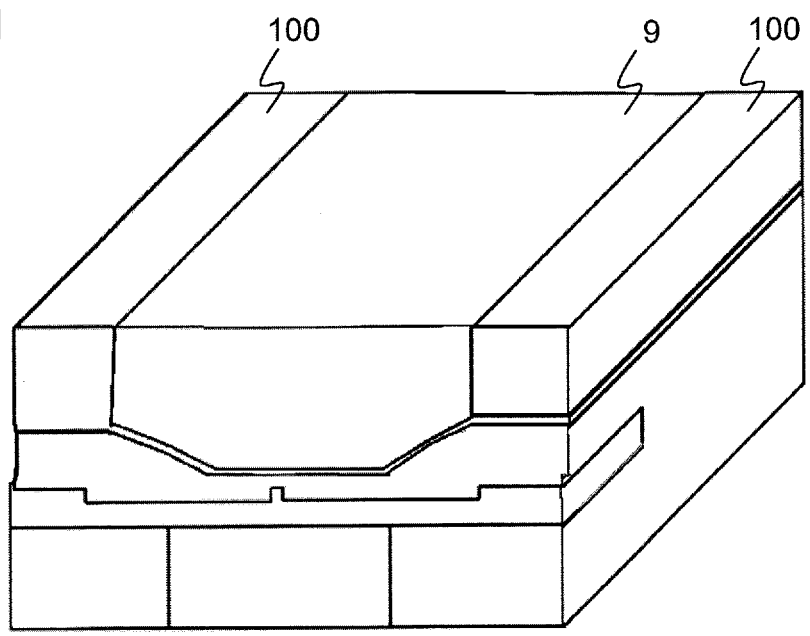

Next, as illustrated in FIG. 9J, SiO$_2$ layers 97 that eventually become portions of the insulating layer 10 are formed on both sides of the near-field light generating element 7 by sputtering. Specifically, above the SiO$_2$ layer 96, SiO$_2$ layers are formed by sputtering and a resist is coated. Next, the resist above the near-field light generating element 7 is removed, and the SiO$_2$ layer formed above the SiO$_2$ layer 96 is removed by milling. Next, as illustrated in FIG. 9K, a noble-metal layer 98 that eventually becomes the metal waveguide 8 is formed on the SiO$_2$ layers 97 by sputtering. Next, as illustrated in FIG. 9L, the recording pole 9 is formed on the noble-metal layer 98 by sputtering. The recording pole 9 that is formed in a valley part between two of the SiO$_2$ layers 97 forms the projection part 9b. As illustrated in FIG. 9M, a portion above the near-field light generating element 7 is covered by a resist 99, and potions of the recording pole 9 on the lateral sides of the resist 99 are removed. Next, as illustrated in FIG. 9N, the removed portions are backfilled with noble metals 100 that connect the noble-metal layer 98, and the resist 99 is removed by CMP.

Example

Figure 10A:
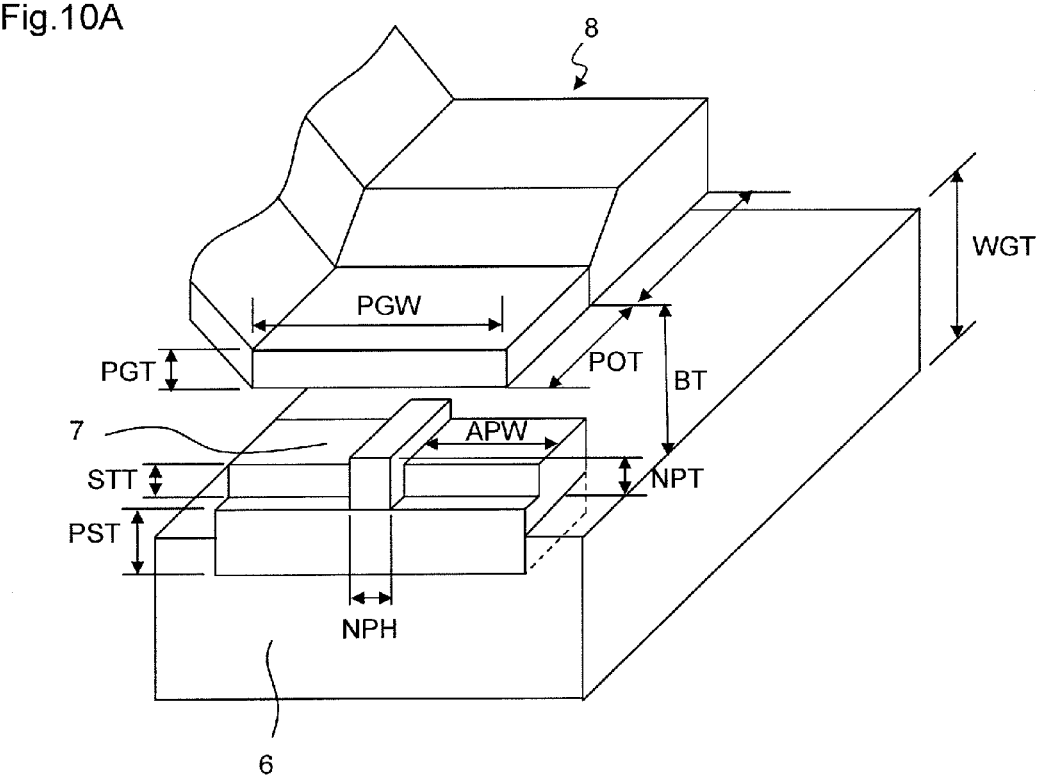
FIG. 10A is a perspective view illustrating optical elements of an example in the vicinity of the air bearing surface.

Using a dielectric waveguide 6, a metal waveguide 8, and a near-field light generating element 7, each of them having the shape illustrated in FIG. 10A, various characteristics were obtained. A core (dielectric waveguide 6) was formed of TaOx (refractive index n=2.08), and a cladding (insulating layer) was formed of SiO$_2$ (refractive index n=1.672). The followings were set: WGT=400 nm, BT=60 nm, POT=30 nm, PGH=1.4 µm, PGT=10 nm, APW=100 nm, NPH=20 nm, STT=25 nm, PST=80 nm, and PGW=100 nm.

Figure 10B:
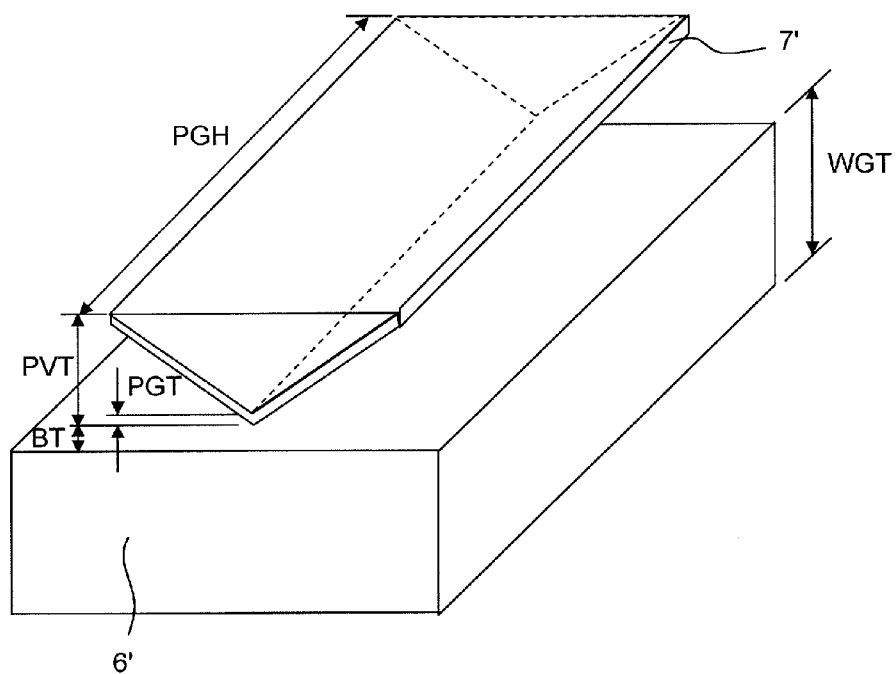
FIG. 10B is a perspective view illustrating optical elements of a comparative example in the vicinity of the air bearing surface.

FIG. 10B illustrates the shape of a V-shaped near-field light generating element 7' and a dielectric waveguide 6', which is a comparative example. A core (dielectric waveguide 6') was formed of TaOx, and a cladding (insulating layer) was formed of Al$_2$O$_3$. The followings were set: WGT=400 nm, PGH=1.2 µm, PVT=100 nm, BT=25 nm, and PGT=30 nm.

Figure 10C:
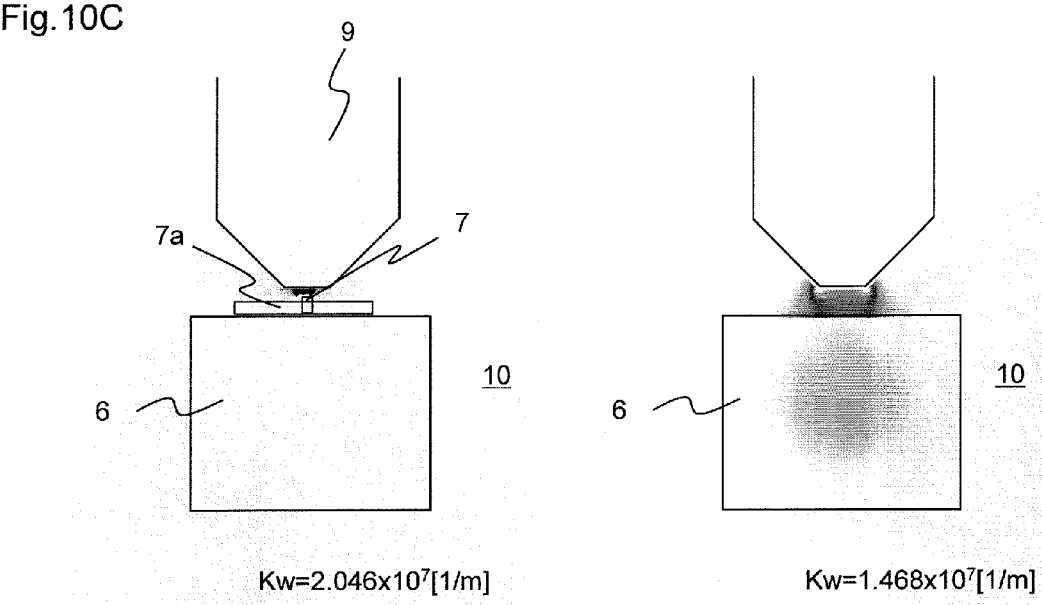
FIG. 10C illustrates calculation examples of light spot size and wavenumber of the example.

Table 1 shows the comparison of the example and the comparative example. Also, FIG. 10C illustrates light spots (dark portions in the figure) and wavenumbers (Kw in the figure) on the A-A cross section, the B-B cross section, and the C-C cross section of FIG. 1B

TABLE 1

| | FW90CT µm | FW90DT µm | Max. Temp. Gradient of RM* K/nm | M/H Ratio | Writing Magnetic Field Intensity Oe |
|---|---|---|---|---|---|
| Comparative Example | 0.094 | 0.091 | 1.11 | 2.1 | 8 |
| Example | 0.048 | 0.055 | 2.58 | 2.2 | 10 |

*RM stands for recording medium

In the table, the FW90CT indicates the length of the region that receives the heat quantity that is 90% or more of the maximum heat quantity in the heat quantity distribution of the heat quantity in the track width direction CT that the surface of a magnetic recording medium receives. Also, the FW90DT indicates the length of the region that receives the heat quantity that is 90% or more of the maximum heat quantity in the heat quantity distribution in the medium traveling direction DT of the heat quantity that the surface of a magnetic recording medium receives. The smaller values mean that heat received by the surface of the magnetic recording medium is focused in a strait region. The values of the example are almost half of the values of the comparative example, and it indicates that the light spot of near-field light is narrowed. The maximum temperature gradient of a magnetic recording medium indicates that the maximum value of a temperature gradient of the surface of a magnetic recording medium, and similarly indicates that light spot of near-field light is narrowed in the example.

FIG. 10C supports these results. In other words, in the C-C cross section illustrating laser light propagating through the dielectric waveguide 6, the spot size is large and, in correspondence thereto, the wavenumber Kw is small. In the B-B cross section illustrating evanescent coupling occurring between the dielectric waveguide 6 and the metal waveguide 8 and the first surface plasmon P1 being generated in the metal waveguide 8, the spot side is smaller than that of the C-C cross section, and in correspondence thereto, the wavenumber Kw is larger than that of the C-C cross section. In the A-A cross section illustrating evanescent coupling occurring between the metal waveguide 8 and the near-field light generating element 7 and the second surface plasmon P2 being generated on the near-field light generating element 7, the spot size is even smaller than that of the B-B cross section, and in correspondence thereto, the wavenumber Kw is even larger than that of the B-B cross section.

The M/H ratio indicates that the ratio of the maximum temperature of a magnetic recording medium to the maximum temperature of a recording head. Because the maximum temperature of a recording head is generated in the vicinity of the near-field light generating element 7, the larger value of the M/H ratio means the better heat dissipation of a recording head, especially the near-field light generating element 7. In the example, the M/H ratio is higher than that of the comparative example, and the heat dissipation is improved. Further, as the result of this, high light energy is applied in a focusing manner to a magnetic recording medium, and writing magnetic field intensity received by the magnetic recording medium is increased compared to the comparative example.

Next, descriptions is given of a magnetic head slider in which the above-described magnetic head is integrated, a head gimbal assembly, and a hard disk device.

Figure 11:
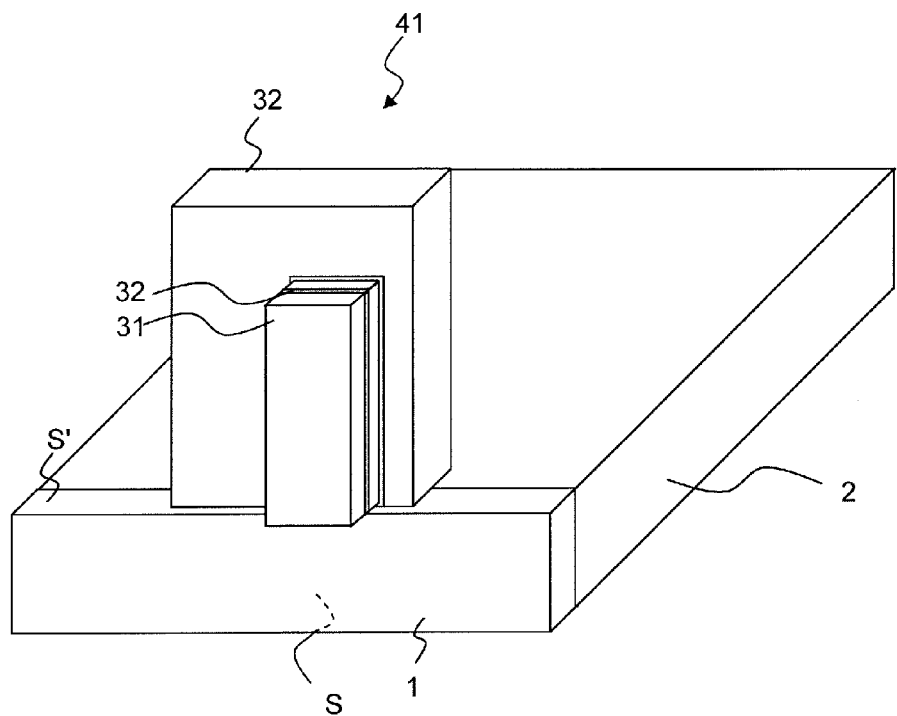
FIG. 11 is a perspective view of a magnetic head slider of the present invention.

FIG. 11 is an external appearance perspective view of the magnetic head slider. A magnetic head slider 41 has the magnetic head 1 and a laser diode 31 of which the position is fixed relative to the magnetic head 1 and that emits laser light. The magnetic head 1 has a substantially hexahedral shape, and one surface of the six outer surfaces is the air bearing surface that faces a magnetic recording medium M. The laser diode 31 is positioned on the surface S' on the opposite side of the air bearing surface S of the magnetic head 1. The active layer 32 in which laser light continuously oscillates faces the surface S' on the opposite side of the air bearing surface S of the dielectric waveguide 6 of the magnetic head 1. The laser diode 31 is provided on the substrate 32, and is soldered to the magnetic head 1 by an adhering layer (not illustrated).

Figure 12:
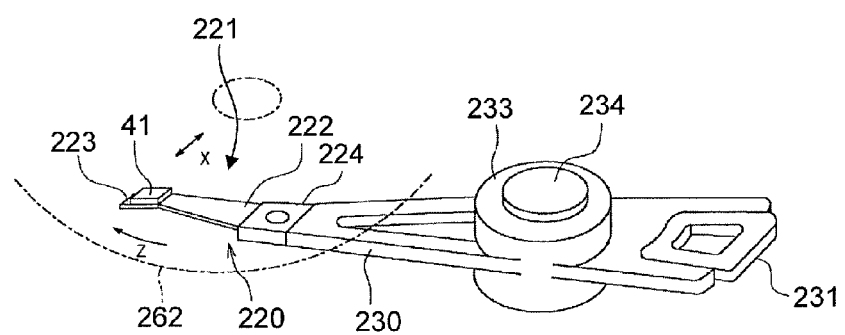
FIG. 12 is a perspective view of a head gimbal assembly of the present invention.

Referring to FIG. 12, a head gimbal assembly 220 includes the magnetic head slider 41 and a suspension 221 elastically supporting the magnetic head slider 41. The suspension 221 includes a load beam 222, a flexure 223 and a base plate 224. The load beam 222 is formed of stainless steel in a plate spring shape. The flexure 223 is arranged in one edge part of the load beam 222. The base plate 224 is arranged in the other edge part of the load beam 222. The magnetic head slider 41 is joined to the flexure 223 to give the magnetic head slider 41 suitable flexibility. At the part of the flexure 223 to which the magnetic head slider 41 is attached, a gimbal part is provided to maintain the magnetic head slider 41 in an appropriate orientation.

An assembly in which the head gimbal assembly 220 is mounted to an arm 230 is referred to as a head arm assembly 221. The arm 230 moves the magnetic head slider 41 in a track crossing direction x of a hard disk 262. One edge of the arm 230 is attached to the base plate 224. To the other edge of the arm 230, a coil 231 that forms one part of a voice coil motor is attached. A bearing part 233 is provided in the middle part of the arm 230. The arm 230 is rotatably supported by a shaft 234 attached to the bearing part 233. The arm 230 and the voice coil motor for driving the arm 230 configure an actuator.

Figure 13:
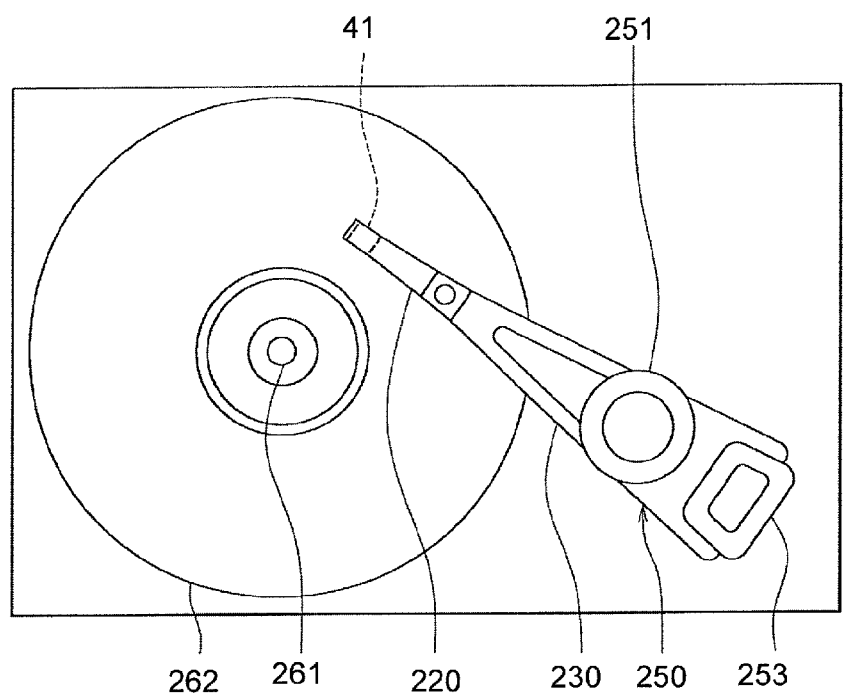
FIG. 13 is a plan view of a hard disk device of the present invention.

FIG. 13 is a plan view of the hard disk drive device. The hard disk drive device includes multiple hard disks 262 attached to a spindle motor 261. For each of the hard disks 262, two magnetic head sliders 41 are arranged in a manner of sandwiching the hard disk 262 and facing each other. The head stack assembly 250 except for the magnetic head slider 41 and the actuator position the magnetic head slider 41 with respect to the hard disk 262 in correspondence with a positioning device as well as supports the magnetic head slider 41. The magnetic head slider 41 is moved in the track crossing direction of the hard disk 262 by the actuator, and is positioned with respect to the hard disk 262. The magnetic head 1 included in the magnetic head slider 41 records information to the hard disk 262 with the above-described recording pole 9 and the near-field light generating element 7, and reproduces information recorded on the hard disk 262 with the MR element 4.

While preferred embodiments of the present invention have been shown and described in detail, and it is to be understood that variety of changes and modifications may be made without departing from the spirit of scope of the following claims or its scope.

What is claimed is:

1. A magnetic head, comprising:
   a dielectric waveguide that is configured to propagate laser light as propagation light;
   a metal waveguide facing the dielectric waveguide, wherein the metal waveguide is configured to couple to the propagation light propagating through the dielectric waveguide in a surface plasmon mode, to generate first surface plasmon with larger wavenumber than that of the propagation light, and to propagate the first surface plasmon;
   a near-field light generating element facing the metal waveguide and extending to an air bearing surface, wherein the near-field light generating element couples to the first surface plasmon propagating through the metal waveguide in a surface plasmon mode, generates second surface plasmon with wavenumber larger than that of the first surface plasmon, propagates the second surface plasmon to an end part on the air bearing surface side, and generates near-field light at the end part on the air bearing surface side; and
   a recording pole that is provided in the vicinity of the near-field light generating element and that has an end part positioned on the air bearing surface.

2. The magnetic head according to claim 1, wherein a cross section of the near-field light generating element on the air bearing surface is a rectangle of which one side faces the pole.

3. The magnetic head according to claim 1, wherein a cross section of the near-field light generating element on the air bearing surface is a trapezoid of which a short side faces the pole, the short side being the one out of two parallel sides.

4. The magnetic head according to claim 1, wherein a cross section of the near-field light generating element on the air bearing surface is a triangle of which one apex faces the pole.

5. The magnetic head according to claim 1, wherein the near-field light generating element has a shape of which a cross section is narrowed toward the air bearing surface.

6. The magnetic head according to claim 1, wherein the near-field light generating element is made of a metal mainly composed of gold, silver, copper, aluminum, or platinum, or an alloy of these, and
   a first heat dissipation layer made of a metal mainly composed of gold, silver, copper, aluminum, or platinum, or an alloy of these, is provided on a back side of the near-field light generating element from the perspective of the recording pole in a manner of contacting the near-field light generating element.

7. The magnetic head according to claim 6, wherein the first heat dissipation layer has a cavity part that opens toward the air bearing surface on at least one side of the near-field light generating element in a track width direction.

8. The magnetic head according to claim 6, wherein the first heat dissipation layer and the metal waveguide are separated at least on the air bearing surface.

9. The magnetic head according to claim 6, wherein a second heat dissipation layer is provided in a position distant from the air bearing surface on at least a lateral side of the near-field light generating element in the track width direction in a manner of contacting the first heat dissipation layer and the near-field light generating element, the second heat dissipation layer being made of a metal mainly composed of gold, silver, copper, aluminum, or platinum, or an alloy of these.

10. The magnetic head according to claim 9, wherein the second heat dissipation layer has a constant film thickness.

11. The magnetic head according to claim 9, wherein the second heat dissipation layer has a film thickness that increases as getting close to the near-field light generating element.

12. The magnetic head according to claim 1, wherein a portion of the recording pole that faces the near-field light generating element has a projection part that is projected toward the near-field light generating element, and
   the metal waveguide is provided on at least a tip end surface of the projection part facing the near-field light generating element.

13. A magnetic head slider, comprising:
   the magnetic head according to claim 1; and
   a laser diode, wherein
   the laser diode is firmly attached to the magnetic head such that an active layer that continuously oscillates laser light faces an end part of the dielectric waveguide of the magnetic head.

14. A head gimbal assembly, comprising:
   the magnetic head slider according to claim 13; and
   a suspension that elastically supports the magnetic head slider, wherein
   the suspension comprises a flexure to which the magnetic head slider is joined, a load beam having one end connected to the flexure, and a base plate connected to the other end of the load beam.

15. A hard disk device, comprising:
the magnetic head slider according to claim 13;
a recording medium positioned facing the magnetic head slider;
a spindle motor that rotatably drives the recording medium; and
a device that support the magnetic head slider and positions the magnetic head slider with respect to the magnetic recording medium.

16. The magnetic head according to claim 1, further comprising:
an insulating layer having a predetermined thickness and being interposed between the metal waveguide and the near-field light generating element.

17. The magnetic head according to claim 16, wherein the dielectric waveguide, the near-field light generating element and the metal waveguide are respectively arranged on the air bearing surface and in a recording medium traveling direction along which a recording medium travels.

* * * * *